US007801846B2

(12) United States Patent
Devine et al.

(10) Patent No.: US 7,801,846 B2
(45) Date of Patent: Sep. 21, 2010

(54) GENERATING LOG SEQUENCE IDENTIFIERS TO APPLY A TRANSACTION TO A STORAGE SYSTEM

(75) Inventors: John T. Devine, Kings Park, NY (US); Chris Fanning, Port Jefferson Station, NY (US)

(73) Assignee: Computer Associates Think, Inc., Islandia, NY (US)

( * ) Notice: Subject to any disclaimer, the term of this patent is extended or adjusted under 35 U.S.C. 154(b) by 213 days.

(21) Appl. No.: 11/278,617

(22) Filed: Apr. 4, 2006

(65) Prior Publication Data

US 2007/0239758 A1    Oct. 11, 2007

(51) Int. Cl.
G06F 7/00    (2006.01)
G06F 17/00    (2006.01)
G06F 11/00    (2006.01)

(52) U.S. Cl. .......................... 707/609; 714/20; 707/703

(58) Field of Classification Search ...................... 707/1, 707/102, 675, 686
See application file for complete search history.

(56) References Cited

U.S. PATENT DOCUMENTS

| 4,412,285 | A | * | 10/1983 | Neches et al. ............... 709/252 |
| 5,778,168 | A | * | 7/1998 | Fuller .......................... 714/18 |
| 5,913,217 | A | * | 6/1999 | Alger et al. .................. 707/101 |
| 6,651,077 | B1 | * | 11/2003 | East et al. .................... 707/204 |
| 6,973,473 | B1 | * | 12/2005 | Novaes et al. ............... 709/201 |
| 7,076,508 | B2 | * | 7/2006 | Bourbonnais et al. ....... 707/202 |
| 2004/0030703 | A1 | * | 2/2004 | Bourbonnais et al. ....... 707/100 |
| 2005/0149525 | A1 | * | 7/2005 | Verma et al. ................... 707/8 |
| 2006/0101081 | A1 | * | 5/2006 | Lin et al. .................... 707/200 |

OTHER PUBLICATIONS

Cahill, Ben, "*OpenDLM Important Software Structures*", http://opendlm.sourceforge.net, Copyright 2004 The OpenDLM Project, 8 pages, Feb. 19, 2004.
Cahill, Ben, "*WHATIS-OpenDLM*", http://opendlm.sourceforge.net, Copyright 2003 The OpenDLM Project, 6 pages, Apr. 7, 2004.
Cahill, Ben, et al., "*HOWTO build and install OpenDLM*" (V0.01), HOWTO_Build,_Install,_and_Configure_OpenDLM, http://opendlm.sourceforge.net, 7 pages, Jun. 16, 2004.

* cited by examiner

*Primary Examiner*—Pierre M Vital
*Assistant Examiner*—Jason Liao
(74) *Attorney, Agent, or Firm*—Baker Botts L.L.P.

(57) ABSTRACT

A method for applying a transaction to a database, the method includes generating a global log sequence identifier (GLSI) value within a first node based on log sequence identifier (LSI) values from one or more additional nodes, generating a local log sequence identifier (LLSI) value within the first node based on the GLSI value generated within the first node, and applying the transaction to the database utilizing the generated LLSI value.

49 Claims, 3 Drawing Sheets

GENERATING LOG SEQUENCE IDENTIFIERS TO APPLY A TRANSACTION TO A STORAGE SYSTEM

TECHNICAL FIELD

The present disclosure relates to log sequence identifiers and, more specifically, to loosely coupled log sequence identifiers.

BACKGROUND

Database management systems (DBMS) play an important role in the gathering, manipulation, classification, storage, and retrieval of information that is central to the workings of modem society.

One key application for DBMS is to manage transactions such as, for example, financial transactions. A transaction may be, for example, a single logical operation on data in the database that the DBMS manages. A transaction may involve multiple tasks that may each be carried out in turn to successfully complete a transaction. An example transaction may be to transfer funds from a savings account to a checking account. This transaction may involve a first step of debiting funds from the savings account and a second step of crediting funds to the checking account.

DBMS are often designed to exhibit a set of qualities known as Atomicity, Consistency, Isolation, and Durability (ACID) properties. Atomicity refers to the ability of the DBMS to guarantee that either all of the tasks that comprise a transaction complete successfully or that none of the tasks that comprise a transaction will be completed successfully. For example, if the task is to transfer funds from a savings account to a checking account and one of these tasks fails to complete successfully, for example, funds cannot be credited to the checking account, the DBMS will prevent the task of debiting funds from the savings account even though it may be able to be successfully completed.

Consistency refers to the ability of the DBMS to ensure that the transaction does not violate one or more integrity constraints. Integrity constraints are rules that govern how transactions may affect data. For example, an integrity constraint may hold that all accounts must have a positive balance. Therefore, a transaction that seeks to transfer funds from a savings account to a checking account will not complete successfully if so doing would leave the savings account with a negative balance, for example, if the funds to transfer are in excess of the savings account balance.

Isolation refers to the ability of the DBMS to isolate database operations. A database operation is an action, such as a transaction or a task that may be performed on an object of database data. By isolating database operations, one operation may not gain access to a database object while another operation is in the process of manipulating that object. Isolation thereby prevents data from being seen in an intermediate state. For example, while a transaction to transfer funds from a savings account to a checking account is pending, at no time may the same funds be observed in either both accounts or neither account. Therefore all transactions on an object must be performed in a series and no two transactions may be said to have commenced at exactly the same time. This property is often expressed as a DBMS having a serializable transaction history.

Durability refers to the ability of a DBMS to ensure that successful transactions may not be undone. For example, once a transaction has been reported successfully completed, a subsequent system failure will not reverse the transaction. Durable DBMS will therefore ensure that the transaction will not have to be aborted after implementing the transaction and reporting successful completion. Durability generally includes recording all successfully completed transactions into a log. The log may therefore be used to recreate the state of the database should database data become corrupted.

Two principal techniques are commonly used by DBMS to ensure ACID properties. Write ahead logging is one such technique. Here, when a transaction seeks to access an object, a lock is placed on that object so that no other transactions may gain access to that object while that transaction is pending. Redo and undo information are then recorded to the log. In the event that a task of the transaction fails, all tasks that have already been completed for that transaction may be backed out using the logged information.

Shadow logging is another such technique. In shadow logging as well, when a transaction seeks to access an object, a lock is placed on that object so that no other transactions may gain access to that object while that transaction is pending. The transaction is then performed on a copy of a relevant portion of the database, for example, the locked objects. If all tasks complete successfully, then the copy of the relevant portion of the database is activated and used as part of the database in place of the original relevant portion. If a task fails to complete successfully then the copy may be discarded.

Many DBMS maintain a single database and a single transaction log. While using only a single database and a single transaction log promotes simplicity, the requirements of users have quickly expanded to the point where a single database is often insufficient. Modern DBMS may involve multiple databases and/or transaction logs. Modern DBMS may additionally provide for high performance database access and/or distributed database access over multiple systems. In such modern DBMS, ensuring integrity of databases, for example, ensuring ACID properties, is becoming increasingly difficult.

SUMMARY

According to one embodiment of the present invention, a method for applying a transaction to a storage system includes generating a global log sequence identifier (GLSI) value within a first node based on log sequence identifier (LSI) values from one or more additional nodes, generating a local log sequence identifier (LLSI) value within the first node based on the GLSI value generated within the first node, and applying the transaction to the database utilizing the generated LLSI value.

According to one embodiment of the present invention, a system for applying transactions to a storage system includes two or more nodes for applying the transactions to the database, each of the two or more nodes includes a global LSI generator for generating GLSI values that are coordinated with LSI values generated by other LSI generators of the other nodes, and a local LSI generator for generating LLSI values.

According to one embodiment of the present invention, a computer system includes a processor and a computer recording medium including computer executable code executable by the processor for applying a transaction to a storage system. The computer executable code includes code for generating a GLSI value within a first node based on LSI values from one or more additional nodes, code for generating an LLSI value within the first node based on the GLSI value generated within the first node, and code for applying the transaction to the database utilizing the generated LLSI value.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
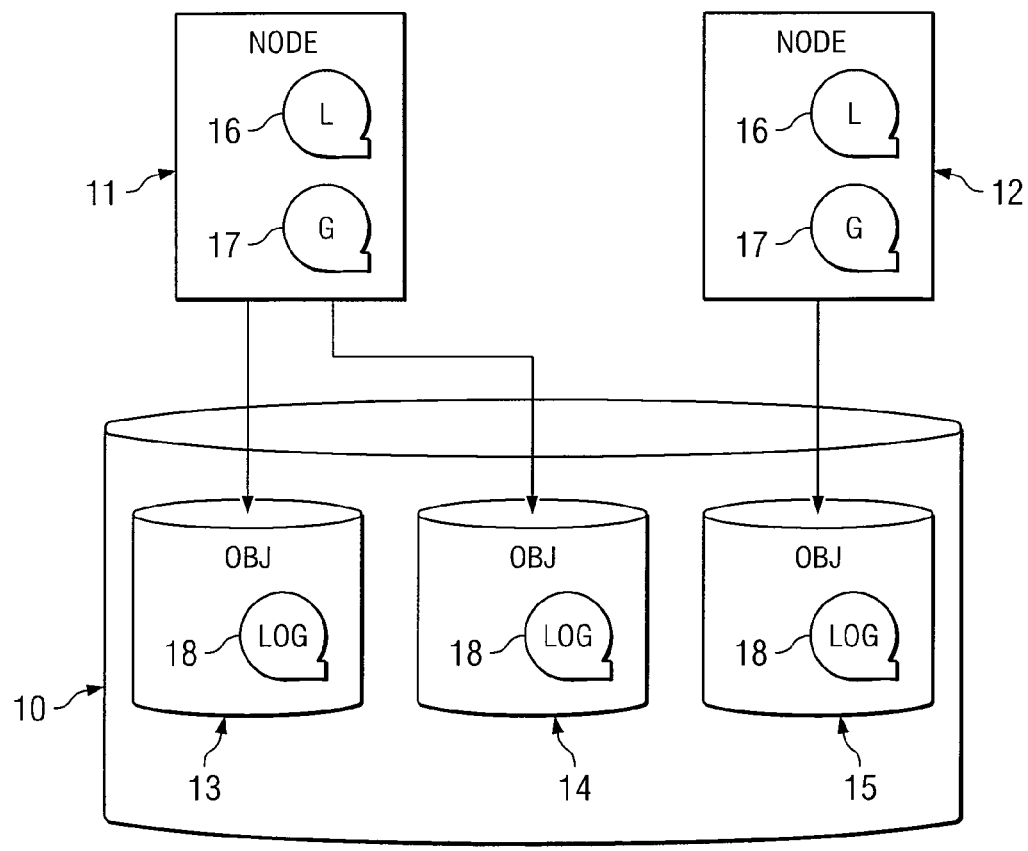
FIG. 1 is a block diagram showing one embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure seek to quickly handle storage system transactions, for example, DBMS transactions and/or clustered file system transactions, while maintaining data integrity. This may be accomplished by using multiple log sequence identifier generators. A log sequence identifier (LSI) generator may be used for producing a unique identifier value for every transaction and/or transaction task that is applied to the database. This LSI may then be used to identify records located in the DBMSs serializable transaction history log. One example of an LSI is a log sequence number (LSN). LSNs are used to label records written to transaction logs to assure that these records are applied/backed out in the correct order when performing operations such as rollforwards and rollbacks on the database. Rollforwards are operations that attempt to reestablish the integrity of a database by reapplying performed transactions in the order in which they originally occurred. Rollbacks are operations that attempt to reestablish the integrity of a database by reversing performed transactions in the reverse of the order in which they originally occurred. An LSI is a more general form of an LSN where the LSI is not necessarily a numeric progression. While LSI need not follow a numeric progression, for simplicity sake a subsequent LSI may still be described as being higher than the previous LSI.

Having a single LSI generator may help to ensure that every task and/or transaction is given a unique identification number that may be used to illustrate the order in which they were applied to the database. However, a single LSI generator may not be able to effectively keep up with the demand of modern DBMSs, especially where the DBMS are tasked with performing enormous numbers of transactions and/or tasks and/or the DBMS is distributed over multiple systems.

Embodiments of the present disclosure utilize multiple LSI generators to satisfy large demand quickly while retaining the ability to keep serializable transaction history logs that may allow for successful rollforwards and/or rollbacks.

FIG. 1 is a block diagram showing one embodiment of the present disclosure. A storage system may comprise a DBMS or a clustered file system. According to the illustrated embodiment, the storage system comprises a DBMS. The DBMS may be distributed and may therefore have multiple nodes 11 and 12. Each node 11 and 12 may be capable of separately performing transactions and/or tasks on data objects 13-15 that may be located within a database 10. A data object may typically be tables or records. If the storage system comprises a clustered file system, the objects may be files. In general, however, objects may be any resource or entity that is recognized by the system. Each node may maintain a local log sequence identifier (LLSI) generator 16 that may be used to generate local LSI values that are unique within the node and loosely coupled to LLSI values produced by LLSI generators 16 of other nodes 11 and 12. Each node may also maintain a global log sequence identifier (GLSI) generator 17 that may be used to generate global LSI values that are universally unique throughout all nodes 11 and 12.

Each data object 13-15 within the database 10 may maintain its own transaction log 18. Within these logs 18, transactions may be recorded using a transaction log sequence identifier XLSI that is related to the LSI that may be generated by the LSI generators 16 and 17 that are located within the transacting node 11 and 12.

Nodes 11 and 12 and may then perform transactions that may involve one or more data objects 13-15 within the database 10. For example, Node 11 may perform a transaction that utilizes data objects 13 and 14 while Node 12 may perform a transaction that utilizes data object 15.

Figure 2:
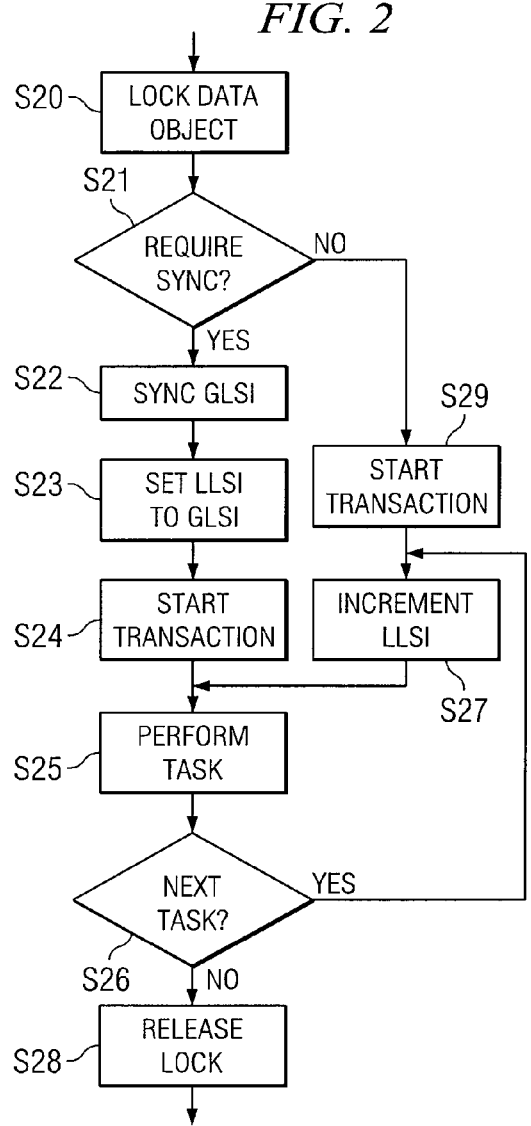
FIG. 2 is a flow chart showing LSI generation according to an embodiment of the present disclosure.

FIG. 2 is a flow chart showing LSI generation according to an embodiment of the present disclosure. As described above, many DBMSs place a lock on a data object that is the subject of a transaction to ensure ACID properties. Similarly, according to an embodiment of the present disclosure, when a data object is the subject of a transaction, that data object may be locked (Step S20) so that the node performing a transaction on the data object (the active node) has exclusive access to that data object throughout the pendency of the transaction.

Where required (Yes, Step S21), the GLSI generator of the active node may coordinate, for example, synchronize, its GLSI value with the rest of the system to obtain a GLSI (Step S22). The coordinated GLSI may be a value that is higher than every LLSI used by every node in the system. This value may be derived from a synchronized clock or by determining a highest previously issued LSI by direct examination of the previously written transaction logs on all nodes. An implementation may use a network messaging system but shared storage or distributed lock manager lock value blocks may be utilized as well. Alternatively, there may be a universal GLSI generator that generates GLSI for all nodes in the system.

It may be understood that the less frequently global synchronization occurs the more efficiently the DBMS may be. Embodiments of the present disclosure therefore seek to minimize the number of global synchronizations necessary to preserve data integrity and/or the ability of the DBMS to perform operations such as rollforwards and rollbacks on the database. According to some embodiments of the present disclosure, global synchronization of LSI may occur less than once for every transaction. Therefore it may be determined whether global synchronization is required (Step S21). Where it is not, the transaction may begin (Step S29) and the first LLSI used for the transaction may be an incrimination of the most recently used LSI local to the node (Step S27) as described below.

Once a GLSI has been generated (Step S22), the GLSI may be used to initialize a local LLSI generator so that subsequently produced LLSIs are at least as great as the synchronized GLSI (Step S23). The first LLSI so produced may be the transaction LSI (XLSI) and may be used to reference the pending transaction in the transaction log local to the active node. It may be useful for the LLSI generator to obtain and reserve a block of LSI values that can be used as subsequent LLSIs. So doing may prevent other transactions and tasks being handled by other nodes from sharing the same LLSIs as the tasks related to this transaction. Alternatively, each node may have a node identification value and this node identification value may be incorporated into the LSI values produced by each node, for example, the node identification value may be the least significant bit(s) of the LSI.

The transaction may begin (Step S24). Each task of the transaction may be issued an LLSI that may be used to reference the task in the transaction log local to the active node as the task is performed (Step S25). If the pending transaction has additional tasks to perform (Yes, Step S26) then the LLSI generator increments the LLSI for the next task (Step S27) until all tasks are performed. When there are no tasks left to perform (No, Step S26), the transaction may be completed and the lock may be released (Step S28).

By synchronizing the LSI once per transaction, the number of synchronizations may be kept low in relation to the total number of LSIs that are generated for all transactions and tasks. Embodiments of the present disclosure may benefit from the tendency of DBMS, for example, those exhibiting ACID properties, to prevent more than one transaction from being directed at the same data object at the same time. Because embodiments of the present disclosure may provide for a globally unique XLSI, the benefits of serializable transaction history logs may be maintained even where LLSIs of transactions not relating to the same data objects may not have LSIs that are necessarily chronological with respect to one another (non-monotonic).

Figure 3:
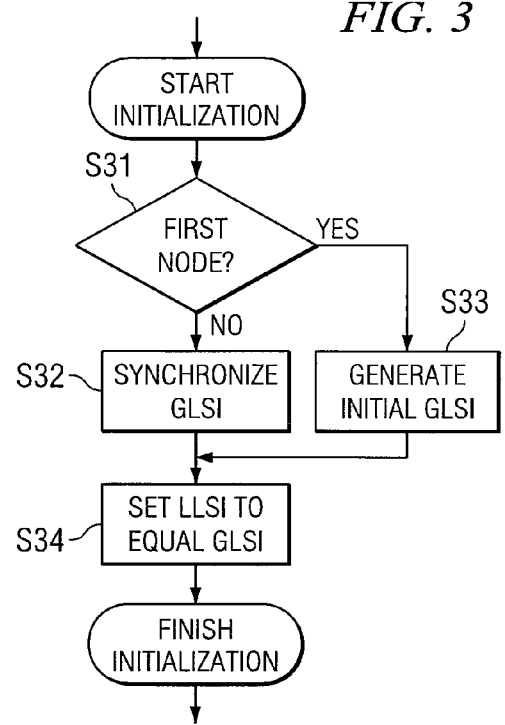
FIG. 3 is a flow chart showing initialization of the generation of LSI according to an embodiment of the present disclosure.

FIG. 3 is a flow chart showing initialization of the generation of LSI according to an embodiment of the present disclosure. When a node starts to initialize the generation of an LSI, for example, when a transaction is initiated, it may be determined whether this is the first time a node has requested the generation of an LSI (Step S31). Where it is (Yes, Step S31), an initial GLSI may be generated (Step S33). The initial GLSI may have any value, but a low value may be preferable. The initial GLSI may be generated, for example, from the current system time. Where it is not the first time a node has requested the generation of an LSI (No, Step S31), the GLSI may be synchronized (Step S32). Synchronization may ensure that the GLSI is at least higher than all LLSI used by all nodes in the system. The first LLSI may then be set to be equal to the GLSI (Step S34). This first LLSI may be considered the XLSI.

Figure 4A:
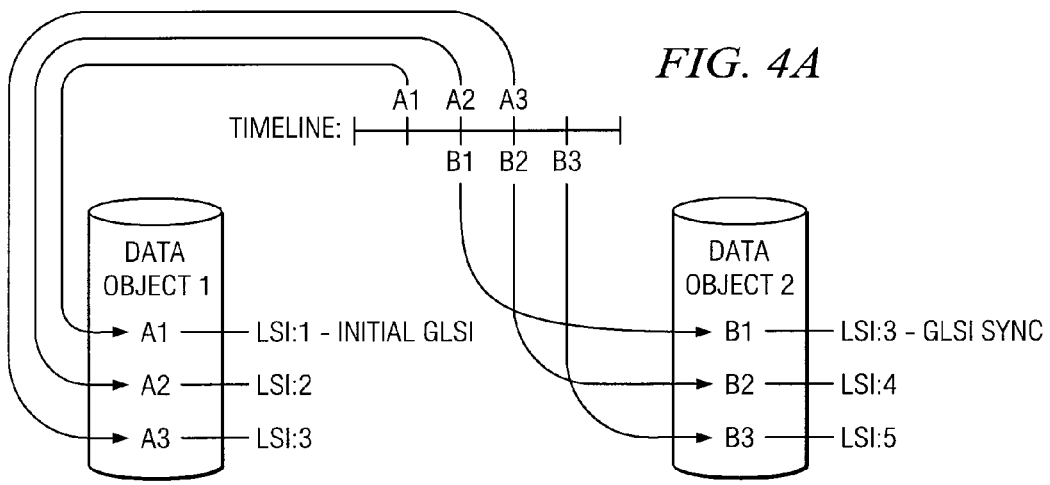
FIG. 4A is a block diagram showing an embodiment of the present disclosure having two transactions where each transaction affects a separate data object.
Figure 4B:
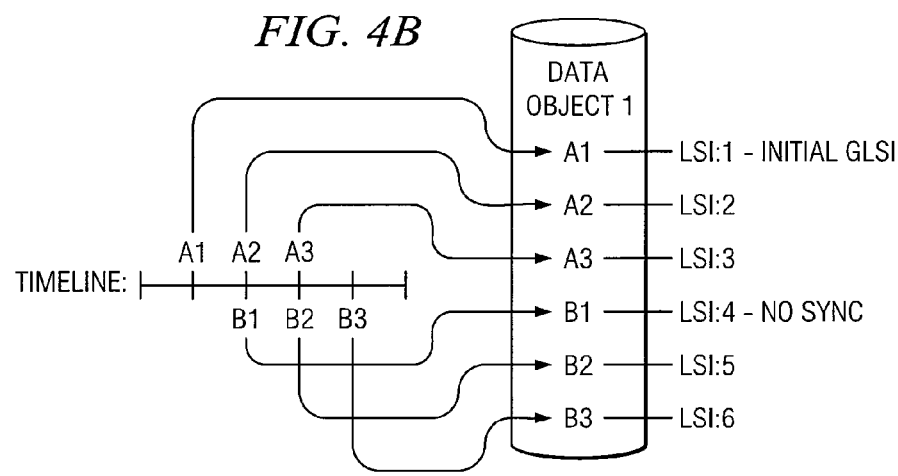
FIG. 4B is a block diagram showing an embodiment of the present disclosure having two transactions where each transaction affects the same data object.
Figure 4C:
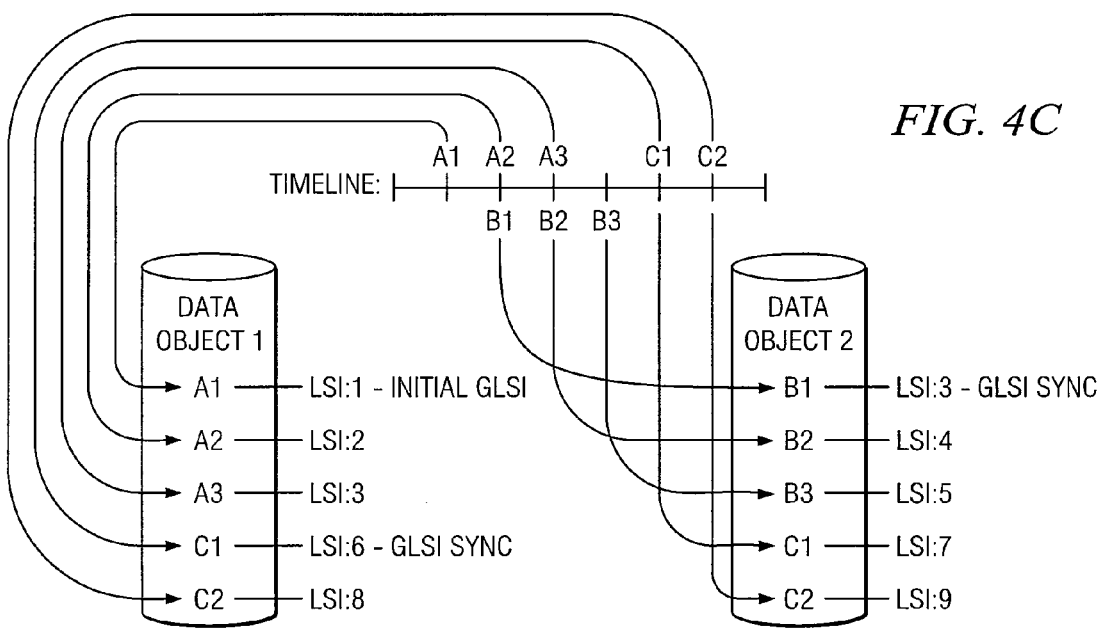
FIG. 4C is a block diagram showing an embodiment of the present disclosure having three transactions where transaction a transaction affects multiple data objects.

According to an embodiment of the present disclosure, global synchronization need only occur at the beginning of a transaction where no transaction has yet been performed on the subject data object, where the transaction involves multiple data objects. This embodiment of the present disclosure therefore permits new transactions to proceed without obtaining a XLSI through global synchronization where a transaction has already occurred on the subject data object and where only one data object is affected by the transaction. FIGS. 4A-4C are block diagrams that illustrate examples of this embodiment.

FIG. 4A is a block diagram showing two transactions, transaction A initiated from node A and transaction B initiated from node B, where each transaction affects a separate data object. Each transaction is comprised of three tasks. The timeline shows the chronological order in which the tasks were issued while their LSI value shows the order in which operations such as rollforwards and rollbacks would be performed on the database.

When task A1 is performed, data object 1 is locked. An initial GLSI is generated as described above. Here the GLSI generated is 1. This GLSI becomes the transaction LSI (XLSI) as well as the first LLSI produced. Next task A2 is performed. This task is given an LSI that is the next LLSI, here 2. Next task B1 is performed and object 2 is locked. Because this is the first time a task has been performed on this data object, a global synchronization is conducted to establish a GLSI and thereby establishing a XLSI. Because the highest LLSI system wide is 2, this task is given an LSI of 3. Next task A3 is performed. This task is given the next LLSI local to node A, here 3. Task A3 has been given the same LSI as task B1 even though task B1 has occurred prior to task A3. While this LSI sequence is non-monotonic, it does not hinder the ability to perform operations such as rollforwards and rollbacks because the order in which tasks have occurred within each data object has been preserved. Next task B2 is performed. This task is given the next LLSI local to node B, here 4. Next task B3 is performed, and is given the next LLSI local to node B 2, here 5.

FIG. 4B is a block diagram showing two transactions, transaction A initiated from node A and transaction B initiated from node B, where each transaction affects the same data object. This figure closely parallels the description given above and shown in FIG. 4A, however, here transaction B may not be initiated until after transaction A has completed because of the lock placed on data object 1 by transaction A. At the completion of transaction A, transaction B may be initiated. Because transaction B does not concern more than one data object and because it is not the first transaction, no global synchronization is required to produce the first LSI for task B1. Task B1 may instead scan data object 1 to produce an LSI that is larger than all LLSI local to data object 1.

FIG. 4C is a block diagram showing three transactions, transaction A initiated from node A, transaction B initiated from node B, and transaction C initiated from node C, where transaction A affects data object 1, transaction B affects data object 2, and transaction C affects data objects 1 and 2. This figure closely parallels the description given above and shown in FIG. 4A, however, here transaction C occurs after the completion of transaction B. Here the GLSI is globally synchronized because the transaction affects more than one data object. Task C1 may therefore be given a GLSI of 6 to ensure that the GLSI is larger than all LLSI values system wide. When task C1 is performed on data object 2, the next LLSI available to Node C may be used, here LSI 7. Likewise task C2 is given an LSI of 8 when applied to data object 1, and an LSI of 9 when applied to data object 2.

Alternatively, it may be desirable for a given node to add its unique node identification value to the least significant bit of the LSI values. If the node identification value of node A is 1, the node identification values of the tasks are as shown in the chart below:

| Task | Original LSI | New LSI |
|------|--------------|---------|
| A1   | 1            | 11      |
| A2   | 2            | 21      |
| A3   | 3            | 31      |
| B1   | 3            | 32      |

-continued

| Task | Original LSI | New LSI |
|---|---|---|
| B2 | 4 | 42 |
| B3 | 5 | 52 |
| C1-Obj 1 | 6 | 63 |
| C1-Obj 2 | 7 | 73 |
| C2-Obj 1 | 8 | 83 |
| C2-Obj 2 | 9 | 93 |

Adding this node identification value may help to ensure that every LSI is globally unique without adversely affecting the order of the LSI.

Other methods for determining whether a global synchronization of the GLSI is necessary at the start of a transaction are possible according to embodiments of the present disclosure. One such example is to compare the current GLSI value with the XLSI value for the subject data object. If the GLSI value still matches the XLSI then a new GLSI is obtained by synchronization as described above. The LLSI may then be assigned based on the new GLSI value. Therefore the utilized LSI values may be sufficiently high so that the sequence of applied tasks may be correctly represented in the transaction history log. This method may also assure that one or more tasks on the data object within the transaction may require at most one synchronization, and if there are multiple transactions concurrently acting on different data objects, each transaction may exploit the synchronization initiated by the other transactions to further reduce the overall number of synchronizations required.

Figure 5:
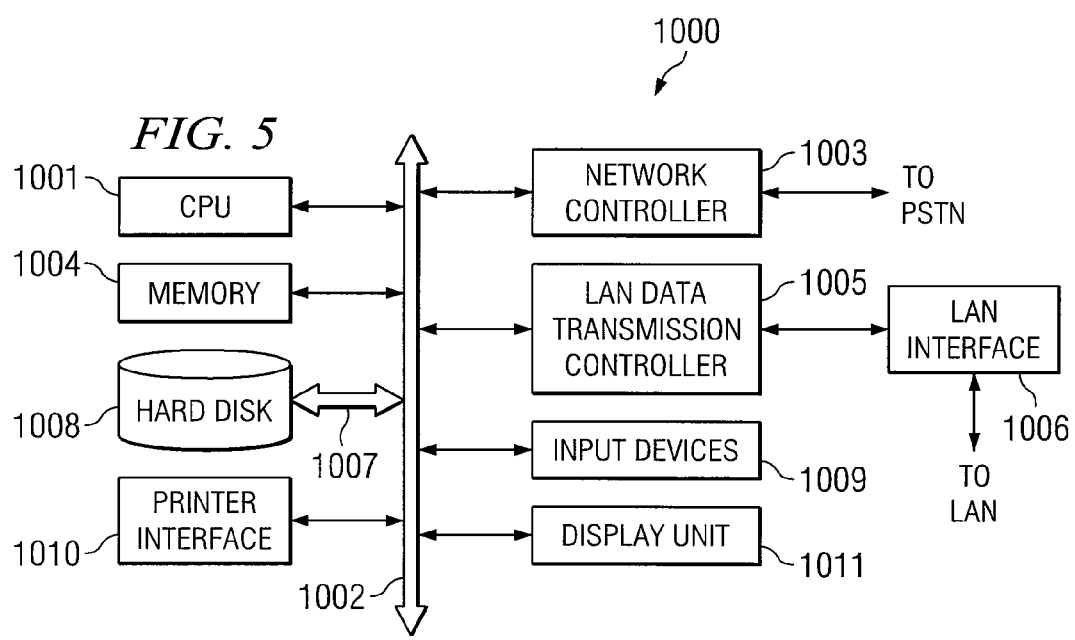
FIG. 5 shows an example of a computer system capable of implementing the method and apparatus according to embodiments of the present disclosure.

FIG. 5 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for applying a transaction to a distributed storage system, comprising:

establishing whether the transaction is a first transaction on a data object by a first node and any one of a plurality of additional nodes and whether the transaction affects a plurality of data objects;

if the transaction is not a first transaction on a data object and does not affect a plurality of data objects, performing steps comprising:

identifying, by a first node, a first Log Sequence Identifier (LSI) value assigned to a previous task performed on the data object; and generating, by the first node, a second LSI value, wherein the second LSI value is a next sequential LSI value after the first LSI value;

if the transaction is a first transaction on a data object or if the transaction affects a plurality of data objects, generating a Global Log Sequence Identifier (GLSI) value by the first node that is greater than all Log Sequence Identifier (LSI) values from one or more additional nodes;

generating a Local Log Sequence Identifier (LLSI) value by the first node in accordance with at least one of the second LSI value and the GLSI value generated at the first node; and applying the transaction to the distributed storage system utilizing the generated LLSI value, and wherein the first node is configured to apply one or more first transactions to the distributed storage system, the one or more additional nodes are configured to apply one or more second transactions to the distributed storage system, each of the first node and the one or more additional nodes are configured to concurrently apply their respective transactions to the distributed storage system.

2. The method of claim 1, wherein the distributed storage system comprises a database.

3. The method of claim 1, wherein the distributed storage system comprises a clustered file system.

4. The method of claim 1, wherein the LLSI value comprises a node identifier (ID) value corresponding to the first node.

5. The method of claim 1, wherein the LLSI value comprises a node ID value corresponding to the first node, the node ID value included as at least one significant bit of the LLSI value.

6. The method of claim 1, wherein:

the GLSI value and the LLSI value comprise the LSI values; and the LSI values comprise one or more log sequence numbers (LSNs).

7. The method of claim 1, wherein the transaction comprises one or more tasks.

8. The method of claim 1, wherein the transaction comprises one or more tasks, a first task of the one or more tasks being assigned the generated LLSI value, one or more additional tasks of the one or more tasks being assigned one or more subsequent LLSI values that are sequentially incremented.

9. The method of claim 1, wherein the LSI values from the one or more additional nodes are obtained no more than one time per transaction.

10. The method of claim 1, further comprising maintaining one or more transaction logs, the one or more transaction logs listing:

each transaction that has been applied to the distributed storage system according to the generated LLSI value; and each of one or more tasks that have been applied to the distributed storage system according to the LLSI values assigned to the tasks.

11. The method of claim 1, wherein generating the LLSI value at the first node in accordance with the GLSI value generated at the first node further comprises:

reserving a block of sequential LLSI values.

12. The method of claim 1, wherein:
the storage system comprises two or more data objects;
each of the first node and the one or more additional nodes are configured to concurrently apply a plurality of additional transactions to different data objects of the two or more data objects; and
when an additional transaction is pending on a particular data object, the particular data object is locked such that no other additional transaction may be applied to the particular data object until the pending transaction has been completed and the lock has been removed.

13. The method of claim 1, the determining whether global synchronization is required at a first node further comprising:
establishing whether the first node has previously requested generation of a Log Sequence Identifier (LLSI) value; and
if the first node has previously requested generation of an LLSI value, then determine that global synchronization is required.

14. The method of claim 1, the determining whether global synchronization is required at a first node further comprising:
establishing whether the transaction is a first transaction; and
if the transaction is a first transaction, then determine that global synchronization is not required.

15. The method of claim 1, the determining whether global synchronization is required at a first node further comprising:
establishing whether the transaction affects a plurality of data objects; and
if the transaction affects a plurality of data objects, then determine that global synchronization is required.

16. A method for performing one or more operations on a distributed storage system, comprising:
applying a transaction to the distributed storage system using one or more non-monotonic identification values generated by:
establishing whether the transaction is a first transaction on a data object by a first node and any one of a plurality of additional nodes and whether the transaction affects a plurality of data objects;
if the transaction is not a first transaction on a data object and does not affect a plurality of data objects,
identifying, by a first node, a first Log Sequence Identifier (LSI) value assigned to a previous task performed on the data object; and
generating, by the first node, a second LSI value, wherein the second LSI is a next sequential LSI value after the first LSI;
if the transaction is a first transaction on a data object or if the transaction does affect a plurality of data objects, generating a Global Log Sequence Identifier (GLSI) value by the first node that is greater than all Log Sequence Identifier (LSI) values from one or more additional nodes; and
generating a Local Log Sequence Identifier (LLSI) value by the first node in accordance with at least one of the second LSI and the GLSI value generated at the first node; and
performing the one or more operations on the distributed storage system, and
wherein the first node is configured to apply one or more first transactions to the distributed storage system, the one or more additional nodes are configured to apply one or more second transactions to the distributed storage system, each of the first node and the one or more additional nodes are configured to concurrently apply their respective transactions to the distributed storage system.

17. The method of claim 16, wherein the distributed storage system comprises a database.

18. The method of claim 16, wherein the distributed storage system comprises a clustered file system.

19. The method of claim 16, wherein the one or more operations comprises a rollback operation.

20. The method of claim 16, wherein the one or more operations comprises a rollforward operation.

21. The method of claim 16, wherein the one or more non-monotonic identification values are loosely coupled to each other.

22. A system configured to apply one or more transactions to a distributed storage system, comprising:
two or more nodes configured to:
establish whether the transaction is a first transaction on a data object and whether the transaction affects a plurality of data objects; and
apply the one or more transactions to the storage system, each node of the two or more nodes comprising:
a Global Log Sequence Identifier (GLSI) generator configured to:
if the transaction is a first transaction on a data object or if the transaction affects a plurality of data objects, generate a GLSI value that is greater than all Log Sequence Identifier (LSI) values generated by one or more other nodes of the two or more nodes; and
if the transaction is not a first transaction on a data object and does not affect a plurality of data objects perform steps comprising:
identifying a first Log Sequence Identifier (LSI) value assigned to a previous task performed on the data object; and
generate a second LSI value, wherein the second LSI value is a next sequential LSI value after the first LSI value; and
a Local Log Sequence Identifier (LLSI) generator configured to generate an LLSI value in accordance with at least one of the second LSI value and the GLSI value,
wherein a first node of the two or more nodes is configured to apply one or more first transactions to the distributed storage system, a second node of the two or more nodes is configured to apply one or more second transactions to the distributed storage system, each of the first node and the second node are configured to concurrently apply their respective transactions to the distributed storage system.

23. The system of claim 22, wherein the distributed storage system comprises a database.

24. The system of claim 22, wherein the distributed storage system comprises a clustered file system.

25. The system of claim 22, wherein the LLSI value comprises a node identifier (ID) value corresponding to the each node.

26. The system of claim 22, wherein the LLSI value comprises a node ID value corresponding to the each node, the node ID value included as at least one significant bit of the LLSI value.

27. The system of claim 22, wherein:
the GLSI value and the LLSI value comprise the LSI values; and
the LSI values comprise one or more log sequence numbers (LSNs).

28. The system of claim 22, wherein the transaction comprises one or more tasks.

29. The system of claim 22, wherein the transaction comprises one or more tasks, a first task of the one or more tasks being assigned the generated LLSI value, one or more additional tasks of the one or more tasks being assigned one or more subsequent LLSI values that are sequentially incremented.

30. The system of claim 22, wherein the LSI values from the one or more other nodes are obtained no more than one time per transaction.

31. The system of claim 22, wherein one or more transaction logs are maintained, the one or more transaction logs listing:
each transaction that has been applied to the distributed storage system according to the generated LLSI value; and
each of one or more tasks that have been applied to the distributed storage system according to the LLSI values assigned to the tasks.

32. The system of claim 22, the LLSI generator configured to generate the LLSI value in accordance with the GLSI value by:
reserving a block of sequential LLSI values.

33. The system of claim 22, wherein:
the distributed storage system comprises two or more data objects;
each of the each node and the one or more other nodes are configured to concurrently apply a plurality of additional transactions to different data objects of the two or more data objects; and
when an additional transaction is pending on a particular data object, the particular data object is locked such that no other additional transaction may be applied to the particular data object until the pending transaction has been completed and the lock has been removed.

34. A random access memory storing software configured to apply a transaction to a distributed storage system, the software embodied in random access memory accessible by a computer system and configured to:
establish whether the transaction is a first transaction on a data object by a first node and any one of a plurality of additional nodes and whether the transaction affects a plurality of data objects;
if the transaction is not a first transaction on a data object and does not affect a plurality of data objects, perform steps comprising:
identifying, by a first node, a first Log Sequence Identifier (LSI) value assigned to a previous task performed on the data object; and
generate, by the first node, a second LSI value, wherein the second LSI value is a next sequential LSI value after the first LSI value;
if the transaction is a first transaction on a data object or if the transaction affects a plurality of data objects, generate a Global Log Sequence Identifier (GLSI) value by the first node that is greater than all Log Sequence Identifier (LSI) values from one or more additional nodes;
generate a Local Log Sequence Identifier (LLSI) value by the first node in accordance with at least one of the second LSI value and the GLSI value generated at the first node; and
apply the transaction to the distributed storage system utilizing the generated LLSI value, and
wherein the first node is configured to apply one or more first transactions to the distributed storage system, the one or more additional nodes are configured to apply one or more second transactions to the distributed storage system, each of the first node and the one or more additional nodes are configured to concurrently apply their respective transactions to the distributed storage system.

35. The random access memory of claim 34, wherein the distributed storage system comprises a database.

36. The random access memory of claim 34, wherein the distributed storage system comprises a clustered file system.

37. The random access memory of claim 34, wherein the LLSI value comprises a node identifier (ID) value corresponding to the first node.

38. The random access memory of claim 34, wherein the LLSI value comprises a node ID value corresponding to the first node, the node ID value included as at least one significant bit of the LLSI value.

39. The random access memory of claim 34, wherein:
the GLSI value and the LLSI value comprise the LSI values; and
the LSI values comprise one or more log sequence numbers (LSNs).

40. The random access memory of claim 34, wherein the transaction comprises one or more tasks.

41. The random access memory of claim 34, wherein the transaction comprises one or more tasks, a first task of the one or more tasks being assigned the generated LLSI value, one or more additional tasks of the one or more tasks being assigned one or more subsequent LLSI values that are sequentially incremented.

42. The random access memory of claim 34, wherein the LSI values from the one or more additional nodes are obtained no more than one time per transaction.

43. The random access memory of claim 34, further configured to maintain one or more transaction logs, the one or more transaction logs listing:
each transaction that has been applied to the distributed storage system according to the generated LLSI value; and
each of one or more tasks that have been applied to the distributed storage system according to the LLSI values assigned to the tasks.

44. The random access memory of claim 34, further configured to generate the LLSI value at the first node in accordance with the GLSI value generated at the first node by:
reserving a block of sequential LLSI values.

45. The random access memory of claim 34, wherein:
the storage system comprises two or more data objects;
each of the first node and the one or more additional nodes are configured to concurrently apply a plurality of additional transactions to different data objects of the two or more data objects; and
when an additional transaction is pending on a particular data object, the particular data object is locked such that no other additional transaction may be applied to the particular data object until the pending transaction has been completed and the lock has been removed.

46. A system for applying a transaction to a storage system, comprising:
means for establishing whether the transaction is a first transaction on a data object by a first node and any one of a plurality of additional nodes and whether the transaction affects a plurality of data objects;
means for if the transaction is not a first transaction on a data object and does not affect a plurality of data objects, performing steps comprising:
identifying, by a first node, a first Log Sequence Identifier (LSI) value assigned to a previous task performed on the data object; and generating, by the first node, a second LSI value, wherein the second LSI value is a next sequential LSI value after the first LSI value;

means for if the transaction is a first transaction on a data object or if the transaction affects a plurality of data objects, generating a Global Log Sequence Identifier (GLSI) value by the first node that is greater than all Log Sequence Identifier (LSI) values from one or more additional nodes;

means for generating a Local Log Sequence Identifier (LLSI) value by the first node in accordance with at least one of the second LSI value and the GLSI value generated at the first node; and means for applying the transaction to the distributed storage system utilizing the generated LLSI value, and wherein the first node comprises means for applying one or more first transactions to the distributed storage system, the one or more additional nodes comprise means for applying one or more second transactions to the distributed storage system, each of the first node and the one or more additional nodes comprising means for concurrently applying their respective transactions to the distributed storage system.

47. A method for applying a transaction to a distributed storage system, comprising:

establishing whether the transaction is a first transaction on a data object by a first node and any one of a plurality of additional nodes and whether the transaction affects a plurality of data objects;

if the transaction is not a first transaction on a data object and does not affect a plurality of data objects, performing steps comprising:

identifying, by a first node, a first Log Sequence Identifier (LSI) value assigned to a previous task performed on the data object; and generating, by the first node, a second LSI value, wherein the second LSI value is a next sequential LSI value after the first LSI value;

if the transaction is a first transaction on a data object or if the transaction affects a plurality of data objects, generating a Global Log Sequence Identifier (GLSI) value by the first node that is greater than all Log Sequence Identifier (LSI) values from one or more additional nodes;

generating a Local Log Sequence Identifier (LLSI) value by the first node in accordance with at least one of the second LSI value and the GLSI value generated at the first node, the LLSI value comprising a node ID value corresponding to the first node, the node ID value included as at least one significant bit of the LLSI value, the GLSI value and the LLSI value comprising the LSI values, the LSI values comprising one or more log sequence numbers (LSNs), the LSI values from the one or more additional nodes obtained no more than one time per transaction, generating the LLSI value at the first node in accordance with the GLSI value generated at the first node further comprising reserving a block of sequential LLSI values;

applying the transaction to the distributed storage system utilizing the generated LLSI value, the distributed storage system comprising at least one of a database and a clustered file system, the transaction comprising one or more tasks, a first task of the one or more tasks being assigned the generated LLSI value, one or more additional tasks of the one or more tasks being assigned one or more subsequent LLSI values that are sequentially incremented;

maintaining one or more transaction logs, the one or more transaction logs listing:

each transaction that has been applied to the distributed storage system according to the generated LLSI value; and each of one or more tasks that have been applied to the distributed storage system according to the LLSI values assigned to the tasks;

wherein:

the first node is configured to apply one or more first transactions to the distributed storage system;

the one or more additional nodes are configured to apply one or more second transactions to the distributed storage system, each of the first node and the one or more additional nodes are configured to concurrently apply their respective transactions to the storage system;

the distributed storage system comprises two or more data objects;

each of the first node and the one or more additional nodes are configured to concurrently apply a plurality of additional transactions to different data objects of the two or more data objects; and when an additional transaction is pending on a particular data object, the particular data object is locked such that no other additional transaction may be applied to the particular data object until the pending transaction has been completed and the lock has been removed.

48. A method for applying a transaction to a distributed storage system, comprising:

providing a plurality of nodes for applying transactions to the distributed storage system, each of the plurality of nodes operable to:

generate a Local Sequence Identifier (LSI) that is non-monotonic relative to at least one other LSI generated by another of the plurality of nodes;

generate a Global Log Sequence Identifier (GLSI) that is monotonic relative to every other LSI generated by another of the plurality of nodes;

determining, by a first node, that a transaction is a first transaction on a first data object and affects only the first data object;

generating, by the first node, a first GLSI value for the first transaction, the first GLSI value being greater than all Log Sequence Identifier (LSI) values previously generated by the plurality of nodes;

identifying, by a second node, a subsequent transaction at some point in time after the first transaction;

determining, by the second node, that the subsequent transaction is not a first transaction on the first data object and that the subsequent transaction affects only the first data object;

generating, by the second node, an LSI value for the second transaction, wherein the LSI value is a next sequential value after the first GLSI, wherein the LSI value is non-monotonic relative to at least one other LSI generated by another of the plurality of nodes, and wherein the first node is configured to apply one or more first transactions to the storage system, the second node is configured to apply one or more second transactions to the storage system, each of the first node and the second node are configured to concurrently apply their respective transactions to the distributed storage system.

49. A method for applying a transaction to a distributed storage system, comprising:

providing a plurality of nodes for applying transactions to the distributed storage system, each of the plurality of nodes operable to:
  generate a Local Sequence Identifier (LSI) value that is non-monotonic relative to at least one other LSI value generated by another of the plurality of nodes;
  generate a Global Log Sequence Identifier (GLSI) value that is monotonic relative to every other LSI value generated by another of the plurality of nodes;
in response to determining that a transaction is a first transaction on a first data object or that the transaction affects a plurality of objects, using a first node to generate a GLSI value for the first transaction, the GLSI value being greater than all Log Sequence Identifier (LSI) values previously generated by the plurality of nodes; and in response to determining that a subsequent transaction is not a first transaction on a second data object and does not affect a plurality of data objects, generating a LSI value that is non-monotonic relative to at least one other LSI value generated by another of the plurality of nodes, and wherein the first node is configured to apply one or more first transactions to the storage system, a second node of the plurality of nodes is configured to apply one or more second transactions to the storage system, each of the first node and the second node are configured to concurrently apply their respective transactions to the distributed storage system.

* * * * *